Figure 1:
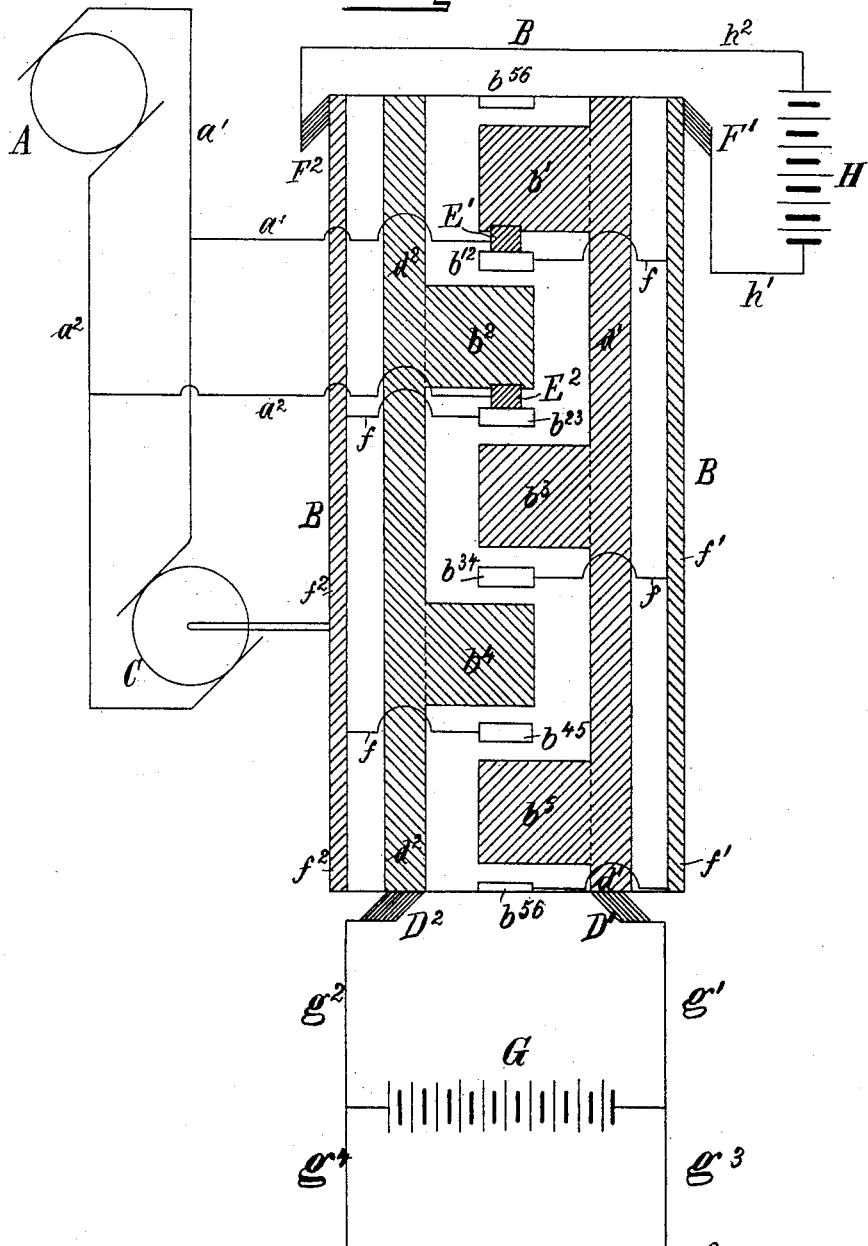

(No Model.) 2 Sheets—Sheet 2.

A. MÜLLER.
TRANSFORMATION OF ALTERNATING CURRENTS INTO DIRECT CURRENTS.

No. 599,789. Patented Mar. 1, 1898.

Witnesses.
B. Sommers
Henry Orth

Inventor:
Adolph Müller
by Henry Orth
atty.

UNITED STATES PATENT OFFICE.

ADOLPH MÜLLER, OF HAGEN, GERMANY.

TRANSFORMATION OF ALTERNATING CURRENTS INTO DIRECT CURRENTS.

SPECIFICATION forming part of Letters Patent No. 599,789, dated March 1, 1898.

Application filed July 30, 1897. Serial No. 646,547. (No model.)

*To all whom it may concern:*

Be it known that I, ADOLPH MÜLLER, a subject of the German Emperor, and a resident of Hagen, Westphalia, Germany, have invented certain new and useful Improvements in and Relating to the Transformation of Alternating Currents into Direct Currents; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has relation to the transformation of alternating currents into direct currents for use for any purpose—as, for instance, for charging electroreceptive devices.
In the charging of electroreceptive devices—as storage batteries, for instance—alternating currents are not available, as a matter of course, because the tension values of these currents between a positive and negative maximum vary in rapid succession in accordance with a curve of sinus, as is well known, while the counter electromotive force developed in charging has a positive tension value that depends solely upon the conditions of charging and changes but very slowly. It would, however, be possible by means of suitable circuit-changing appliances moving synchronously with the alternating currents not only to transform the latter into direct currents, but also to close the charging-circuit through the battery to be charged, or to interrupt said circuit at that phase period where the tension of the charging-current begins to become greater or less than the battery tension, so that these interruptions could be effected without disadvantage, because the tension value of the primary current would then be equal to the counter electromotive force and the circuit without current on that account. There are, however, many difficulties encountered in the practical application of this theory, not only by reason of the differences in the speed of the driving element or motor and load variations, that result in variations in the tension value of the current phases, but also on account of the impossibility to operate the circuit-changing appliance in exact synchronism with the phases of the alternating currents.

It has, prior to my invention, been proposed to so operate the brushes in alternating-current-transforming systems that there will be the least possible deviation between the period of current interruption and the period of tension equality; but owing to the rapid current fluctuations, especially those due to the shifting of the current phases resulting from the passing a synchronism of the circuit-changer, it is impossible to effect the circuit changes so that they will coincide with sufficient accuracy with the periods of tension equality. Consequently there will be strong sparking at the circuit-changer.

This invention has for its object a system for transforming alternating into direct currents for any purpose, but particularly for charging storage batteries, whereby the difficulties above referred to are avoided. This I attain by means of an electroreceptive device capable of generating a counter electromotive force substantially equal to the electromotive force of the alternating current, said device being included in a shunt-circuit adapted to be electrically connected with the charging-circuit during the periods of interruption of the connection between the last-named circuit and the discharging-circuit, so that the charging-circuit during such periods of interruption will remain closed through the electroreceptive device. The latter device, which may be a polarizing-battery, will have the same number of cells as the battery to be charged; but the capacity of said polarizing-battery will be as low as possible in order that an extraordinary small quantity of electricity will suffice to charge the same. Consequently the tension of the polarizing-battery can adapt itself at once to the varying tensions of the charging-current, so that when said battery is included in the charging-circuit the electromotive force of the alternating current will at all times be equal to or approximately equal to the counter electromotive force of such polarizing-battery. During the circuit changes the alternating current is divided in that a part thereof is branched off to the shunt-circuit, after which the connection between the charging and discharging circuits is interrupted. By the means described the interruption of the charging-circuit, as will readily be understood, is avoided and thereby the injurious sparking at the commutator. But that my invention may be fully understood, I will describe the same in detail, reference being had to the accompanying drawings, in which—

Figure 2:
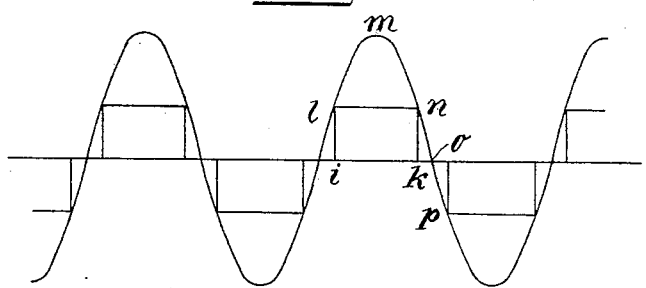
Figure 3:
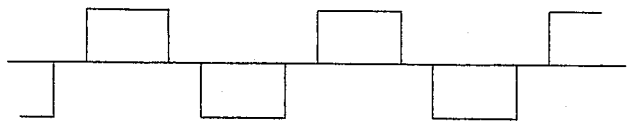

Figure 1 is a diagram of the circuit connections and the commutator-cylinder developed, and Figs. 2 and 3 are detail tension-diagrams.

An alternating-current generator, as a dynamo A, is connected by wires $a'$ and $a^2$ with a commutator B, which may be at any desired distance from said generator, said commutator being revolved by an electric motor C, supplied from generator A. The commutator B is provided with a number of contacts $b'$ $b^2$ $b^3$ $b^4$ $b^5$, of which $b'$ $b^3$ $b^5$ are connected with a contact-ring $d'$ and those $b^2$ $b^4$ with a contact-ring $d^2$ in such manner that said contacts and rings will be insulated from one another by an intervening zigzag or serpentine insulation, as shown in Fig. 1, and form two connected circuit-closing pieces. Centrally between each two contacts are interposed in the insulations intermediate contacts $b^{12}$ $b^{23}$ $b^{34}$ $b^{45}$ $b^{56}$, alternately connected by conductors $f$ with the two contact-rings $f'$ $f^2$, insulated from the contact-rings $d'$ $d^2$.

Current-supply brushes E' E² have bearing on the commutator-cylinder in the plane of the aforementioned contacts, said brushes being arranged at some distance from each other, and are of slightly-greater width than the width of space between a contact and the next intermediate contact, the brushes E' E² being included in the supply-circuit $a'$ $a^2$ through conductors $a^{21}$ $a^{22}$. Current is taken from the contact-rings $d'$ $d^2$ through brushes D' D², respectively included in the circuit $g'$ $g^2$ of the battery G to be charged.

Brushes F' F², included in the shunt-circuit $h'$ $h^2$ of the polarizing-battery H, hereinabove referred to, have bearing on the contact-rings $f'$ $f^2$, respectively.

The current transformation takes place as follows: So long as the brush E' is in contact with $b'$ and the brush E² with contact $b^2$ the alternating current will flow from generator A, circuit-conductors $a'$ $a^{21}$, brush E', contact $b'$, ring $d'$, brush D', conductor $g'$, battery G, conductor $g^2$, brush D², ring $d^2$, contact $b^2$, brush E², and circuit-conductors $a^{22}$ $a^2$ back to opposite pole of generator A, so that during this time the battery G will be charged. This period of time corresponds in the well-known alternating-current diagram, Fig. 2, in which the abscissæ are proportionate to the time period and the ordinates to the tension value of the distance $i\,k$, while the tension value varies according to the curve $l\,m\,n$. The counter electromotive force remains constant during this time in accordance with the straight line $l\,n$. Before the brushes E' E² move out of contact with $b'$ $b^2$ they assume the position shown in Fig. 1, and make contact also with the intermediate contacts $b^{12}$ and $b^{23}$, respectively, whereby the current is divided in such manner that current from brush E' will flow to intermediate contact $b^{12}$, conductor $f$, ring $f'$, brush F', conductor $h'$, polarizing-battery H, conductor $h^2$, brush F², ring $f^2$, conductor $f$, contact $b^{23}$, to brush E². By means of this arrangement the tension of the polarizing-battery will at once be brought to the momentary tension of the alternating current, so that when battery G is cut out of the charging-circuit there will be an equality of tension, and for this reason said circuit will be without current, so that when brushes E' E² move out of contact with $b'$ $b^2$ there will be no sparking. While the tension of the alternating current varies according to curve $n\,o\,p$, Fig. 2, the brushes E' E² are in contact with $b^{12}b^{23}$, so that the polarizing-battery alone is included in the charging-circuit, the counter tension of the battery H following the tension of the alternating current in such manner that both will be approximately equal, then fall to zero, then reverse their values, and finally rise to the charging tension of battery G. At this moment the brushes E' E², before moving out of contact with $b^{12}$ $b^{13}$, come in contact with $b^2$ $b^3$, so that the charging-current, flowing now in an opposite direction through the charging-circuit, (from $a^2$ $a^{22}$ to $d'$,) will be branched off in the same direction as before, through the brushes E' E² to the battery H, which conditions will prevail until after the said brushes have moved out of contact with $b^{12}$ $b^{23}$, after which the operations are repeated in the described manner. It is obvious, therefore, that an interruption of the charging-circuit cannot take place. The battery G is therefore charged by current impulses of like direction and following each other in very rapid succession, with short interruptions, the tension of which currents decreases according to the curve $i\,l\,m$ $n\,o\,k$.

The discharge of the storage battery G can be effected in the usual manner; but, if desired, continuous direct current can be taken from said battery through the conductors $g^3$ $g^4$, which form a continuation of the conductors $g'$ $g^2$, without cutting out the supply-current. The battery G, included in the circuit $g'$ $g^3$ $g^2$ $g^4$, will in the latter case serve merely to equalize the tension differences of the alternating current and impart to the current an uninterrupted uniform tension, while its charging condition, irrespective of the periodical fluctuations due to its function, will remain practically unchanged. The described system may also be used for the conversion of direct into alternating currents, in which case the direct current supplied through circuits $g^3$ $g'$ and $g^4$ $g^2$ will be transformed through the operation of the commutator into current pulsations of alternating direction, the tension-diagram of which is shown in Fig. 3, the function of the two batteries G H remaining the same as described. In this transformation it will, however, be necessary to operate the commutator by direct current if an alternating-current motor in lieu of the dynamo A is to be started automatically.

In the drawings I have shown a simple form of commutator suitable for the purposes of this invention; but to those conversant with the state of the art to which this invention pertains it will be evident that its construction can be variously modified so that the polarizing-battery will be included in the charging-circuit before each current interruption.

The polarizing-battery can be constructed in any desired manner and provided with the required number of elements. To this end steel plates may be used in an alkali lye, or sheet-platinum or bare lead plates in a solution of sulfuric acid, and instead of the polarizing-battery a condenser or condensers may be used.

In those cases where an absolute continuity of the direct current is not essential the storage battery can be dispensed with and an intermittent current taken from the circuit $g'$ $g^3$ $g^2$ $g^4$, consisting of successive current impulses whose tension varies according to the curve $i\, l\, m\, n\, k$, Fig. 2.

With the means described multiphase currents can also be transformed into direct currents, and vice versa, the transformation taking place in the manner described through the medium of a suitably organized or constructed commutator, whereby the multiphase current is transformed into direct current and the individual phases included in or cut out of the discharge-circuit at that point at which the tension value of said phases is exceeded or reduced. In this case the alternating circuit remains likewise closed through the shunt-circuit.

Having thus described my invention, what I claim as new therein, and desire to secure by Letters Patent, is—

1. The combination with an alternating-current charging-circuit, a discharging-circuit, and suitable circuit-changing appliances interposed in said circuits, of a shunt-circuit, means for electrically connecting the same with the charging-circuit, before the connection between the latter and the discharging-circuit is interrupted by said circuit-changing appliance, and an electroreceptive device in said shunt-circuit capable of developing a counter electromotive force substantially equal to the electromotive force of the alternating current during such period of interruption, so that the alternating-current circuit will at the moment of interruption be without current, for the purpose set forth.

2. The combination with an alternating-current circuit, a discharging-circuit, a shunt-circuit, an electroreceptive device of low capacity, as a polarizing-battery, in said shunt-circuit, and suitable circuit-changing appliances interposed in the charging and discharging circuits; of means for electrically connecting the shunt-circuit with the charging-circuit before the electrical connection between the latter and the discharging-circuit is interrupted, to produce a counter electromotive force which, at any moment during the period of interruption, will be substantially equal to the electromotive force of the alternating current whereby the charging-circuit will be without current at the moment of such interruption, for the purpose set forth.

3. The combination with an alternating-current charging-circuit, a discharging-circuit, a storage battery included in said circuit, a shunt-circuit, an electroreceptive device of low capacity, as a polarizing-battery, included in the shunt-circuit, and suitable circuit-changing appliances interposed in the charging and discharging circuits; of means for electrically connecting the charging and shunt circuits before the electrical connections between the charging-circuit and storage battery are interrupted, to produce a counter electromotive force which, at any moment during the period of interruption will be substantially equal to the electromotive force of the alternating current, whereby the charging-circuit will be without current at the moment of interruption, for the purpose set forth.

4. In the mode of transforming alternating into direct currents, electrically connecting a shunt-circuit with the alternating-current circuit before the interruption of the electrical connections between the latter circuit and a discharge-circuit, maintaining said connection between the alternating-current and shunt circuits during the period of interruption and generating in said shunt-circuit a counter electromotive force, which at any moment of the said period of interruption will be substantially equal to the electromotive force or the alternating current, whereby at the moment of said interruption the primary circuit will be without current, for the purpose set forth.

In testimony than I claim the foregoing as my invention I have signed my name in presence of two subscribing witnesses.

ADOLPH MÜLLER.

Witnesses:
HENRY HASPER,
W. HAUPT.